United States Patent [19]
Law

[11] Patent Number: 5,573,164
[45] Date of Patent: Nov. 12, 1996

[54] INTERCHANGEABLY MOUNTED ACCESSORIES FOR VEHICULAR USE

[76] Inventor: Carl F. Law, 1829 Cumberland Trail, Plano, Tex. 75023-3046

[21] Appl. No.: 457,163

[22] Filed: Jun. 1, 1995

Related U.S. Application Data

[63] Continuation-in-part of Ser. No. 180,203, Jan. 11, 1994, abandoned.

[51] Int. Cl.$^6$ ............................................. B60R 7/06
[52] U.S. Cl. ........................ 224/483; 224/277; 224/901; 224/901.8; 224/926; 224/929; 224/571
[58] Field of Search ............................. 224/148, 483, 224/539, 545, 546, 547, 555, 559, 561, 926, 929, 930, 277; 248/206.3, 205.3, 205.2, 316.2, 312, 312.1, 316.5, 306, 310, 311.2, 500; D7/509–511, 513; D11/143

[56] References Cited

U.S. PATENT DOCUMENTS

| | | | |
|---|---|---|---|
| D. 26,023 | 9/1896 | Derr | D7/511 |
| D. 306,985 | 4/1990 | Mason, Jr. | D11/143 |
| 339,148 | 4/1886 | Chvala | 248/310 |
| 1,060,885 | 5/1913 | Beck | 248/310 |
| 1,103,065 | 7/1914 | Longyear | 248/310 |
| 1,161,762 | 11/1915 | Bartlett | 248/310 |
| 1,335,369 | 3/1920 | Donohue | 248/312 |
| 1,462,370 | 7/1923 | Lykins | 248/312 |
| 2,428,056 | 9/1947 | Wachsman | D7/513 |
| 3,881,674 | 5/1975 | Greene, III | 215/100.5 |
| 4,040,549 | 8/1977 | Sadler | 248/311.2 |
| 4,127,211 | 11/1978 | Zerbey | 224/926 |
| 4,345,704 | 8/1982 | Boughton | 224/148 |
| 4,543,473 | 9/1985 | Wells et al. | 219/441 |
| 4,643,381 | 2/1987 | Levy | 248/500 |
| 4,648,572 | 3/1987 | Sokol | 248/205.2 |
| 4,762,258 | 8/1988 | Murphey | 224/567 |
| 4,798,294 | 1/1989 | Bodi | 248/346 |
| 4,801,782 | 1/1989 | Ineson | 219/441 |
| 4,846,382 | 7/1989 | Foultner et al. | 224/483 |
| 4,919,381 | 4/1990 | Buist | 224/42.45 R |
| 5,014,892 | 5/1991 | Copeland | 224/242 |
| 5,025,919 | 6/1991 | Brinker et al. | 224/559 |
| 5,029,720 | 7/1991 | Bridges | 224/281 |
| 5,508,494 | 4/1996 | Sarris et al. | 219/386 |

FOREIGN PATENT DOCUMENTS

| | | | |
|---|---|---|---|
| 3159830 | 7/1991 | Japan | 224/42.45 R |

*Primary Examiner*—Renee S. Luebke
*Assistant Examiner*—Gregory M. Vidovich
*Attorney, Agent, or Firm*—John F. Bryan

[57] ABSTRACT

The present device has a plurality of accessories, including a cup, an office supply kit and a cosmetics kit, each having a base portion of like dimensions including a flat, extended bottom flange. The base portions fit and latch interchangeably into a base mount which is installed on a vehicle dash or console.

20 Claims, 3 Drawing Sheets

INTERCHANGEABLY MOUNTED ACCESSORIES FOR VEHICULAR USE

This is a continuation-in-part of application Ser. No. 08/180,203 filed on Jan. 11, 1994 now abandoned.

FIELD OF THE INVENTION

The present invention relates to accessories removably mounted in a vehicle as used for holding any one of a family of utility devices and more particularly to such a family of utility devices with a common base configuration for interchangeable attachment to a substantially horizontal surface of a vehicle dash or console.

BACKGROUND AND SUMMARY OF THE INVENTION

Commuting to and from the work place in an automobile is common and, with the wide availability of drive-through services and the advent of the mobile telephone and FAX, the car has become a secondary domicile or office of sorts for many people on-the-go. Drinking a beverage en-route has long been recognized as popular practice by inventors, who have provided a number of ingenious cup holders for the vehicle dash or console, and automobile manufacturers have come to provide integrated cup holders and trays as standard features. Other activities routinely seen in this mobile environment are make-up application and business related paper work, either of which is best accomplished in an organized setting. Since virtually every space and pocket in an automobile is already in use, organization is difficult and the best available solution is "cash receipts in the ash tray; memo pad in the glove compartment; and lipstick and mascara in the console". In such a scenario, organization becomes marginal and things are easily lost.

Therefore, it is an object of the present invention to provide means for engaging in any of several activities in an organized manner, and moreover, to accomplish this with improved access and convenience. Other objects will be evident from the description of the invention.

In the present invention these objects are achieved by providing a set of holding devices or accessories, each serving an individual function. Each has the same base configuration so that they will engage interchangeably with a common mount on the dash or console. These holding devices may be a cup, a cosmetics kit, and an office kit, or they may take other specialized forms. A round base flange may be provided for engagement in the common mount so as to allow angular positioning of the holding device. A latch is placed in a first position to retain engagement of the base with the mount and is moved to a second position to allow removal of the holding device and the substitution of another. In the case of a round base flange, the latch may also clamp the base lightly to inhibit undesired rotation of the holding device.

DESCRIPTION OF THE DRAWINGS

The aforementioned and other objects and features of the invention will be apparent from the following detailed description of specific embodiments thereof, when read in conjunction with the accompanying drawings, in which:

FIGS. 7–8 show a fourth accessory of the present invention in the form of holder 70, which is a versatile bracket for holding such electronic accessories as radar detector 72 or cellular telephone 76 for temporary attachment and mounting in an automobile. Suction cups 73 and 74 are affixed to top surface 75 by extended attachment tabs 73e and 74e, which are pulled into place through holes 75a and 75b in top surface 75. Thus attached, suction cups provide a versatile connection for temporary retention of radar detector 72, cellular phone 76 or similar electronic electronic accessory. Sides 78 and 79, which extend up at the edges of top surface 75, serve to locate the chosen appliance with respect to suction cups 73 and 74. Base portion 14C of holder 70 includes bottom flange 16C and groove 15C which are shaped the same and dimensionally identical to bottom flange 16 and groove 15 of cup 10 in FIG. 1. Thus, base portion 14C of electronic accessory holder 70 is interchangeably retained in base mount 20 of FIG. 2 in the same manner as previously described for cup 10, office accessory 40 or cosmetics accessory 60.

DETAILED DESCRIPTION OF THE DRAWINGS

Figure 1:
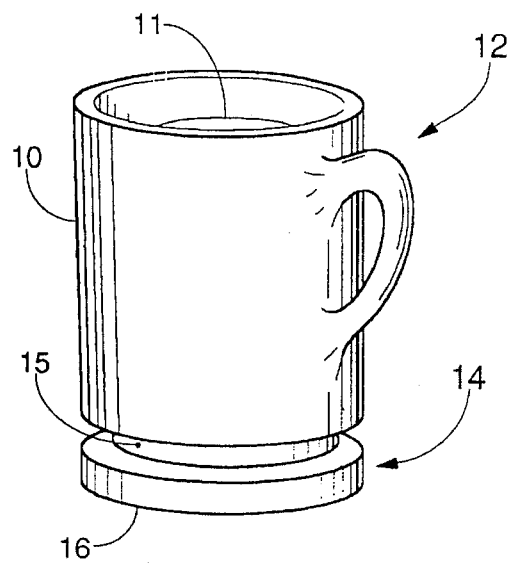
FIG. 1 shows a first accessory of a preferred embodiment of the present invention in the form of a cup.
Figure 2:
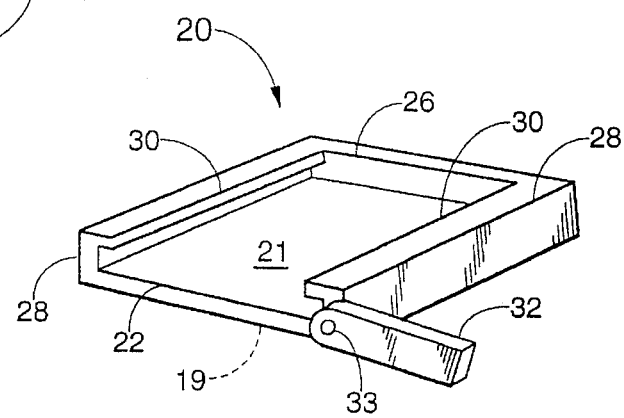
FIG. 2 shows the base mount of preferred embodiment of the present invention.

In FIG. 1, we see a cup 10, which holds the beverage of choice 11 in upper portion 12 and has base portion 14 which has a circular cross-section. Base portion 14 includes groove 15 set immediately above flat, extended bottom flange 16. Turning to FIG. 2, we find base mount 20 having under surface 19 and upper surface 21. Under-surface 19 is provided with either VELCRO or an adhesive for attachment to a substantially horizontal dash or console surface. Upper surface 21 is open at front 22 and bounded by rear wall 26 and side walls 28. Side walls 28 are spaced apart to receive bottom flange 16 with some small clearance and lips 30 project inwardly. If bottom flange 16 is fitted between side walls 28, groove 15 allows lips 30 to fit over extended bottom flange 16. Thus, bottom flange 16 is supported by upper surface 21 and confined by side walls 28, rear wall 26 and lips 30. Latch 32 rotates on pivot pin 33 through approximately 180° from the showing of FIG. 2 and, when repositioned thusly, will bear against bottom flange 16 for positive retention in base mount 20, as is later shown.

Figure 3:
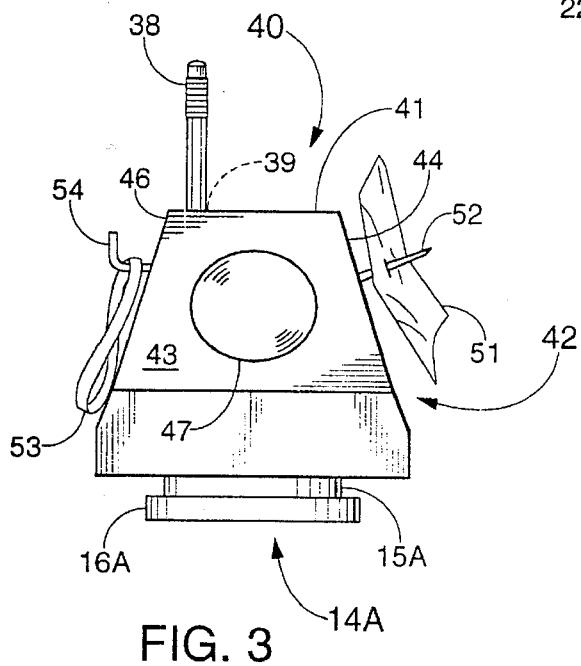
FIG. 3 shows a front view of a second accessory of the preferred embodiment of the present invention.
Figure 4:
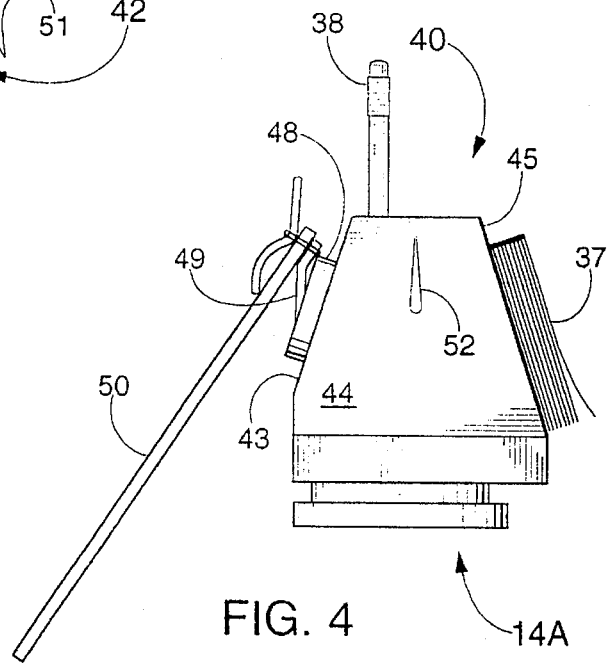
FIG. 4 shows a side view of the second accessory of the present invention of the preferred embodiment of FIG. 1.

FIGS. 3 and 4 show front and side views of an office accessory 40, including upper portion 42 and base portion 14A. Upper portion 42 is a block with top 41, inclined front 43 and rear 45 and inclined sides 44 and 46. Base portion 14A is shaped like base portion 14 of cup 10. Bottom flange 16A and groove 15A are thus dimensionally identical to bottom flange 16 and groove 15 of FIG. 1. Permanent magnet 47 is inset in front 43 and serves to hold steel disc 48 of clipboard 50. Steel disc 48 is attached to clipboard 50 by flexible spring member 49. Top 41 includes holes 39 for holding items such as pencil 38; side 44 includes spike 52 for holding paper items such as receipt 51; side 46 includes hook 54 for holding items such as rubber band 53 and a "sticky back" pad 37 is adhesively attached to rear 45.

Figure 5:
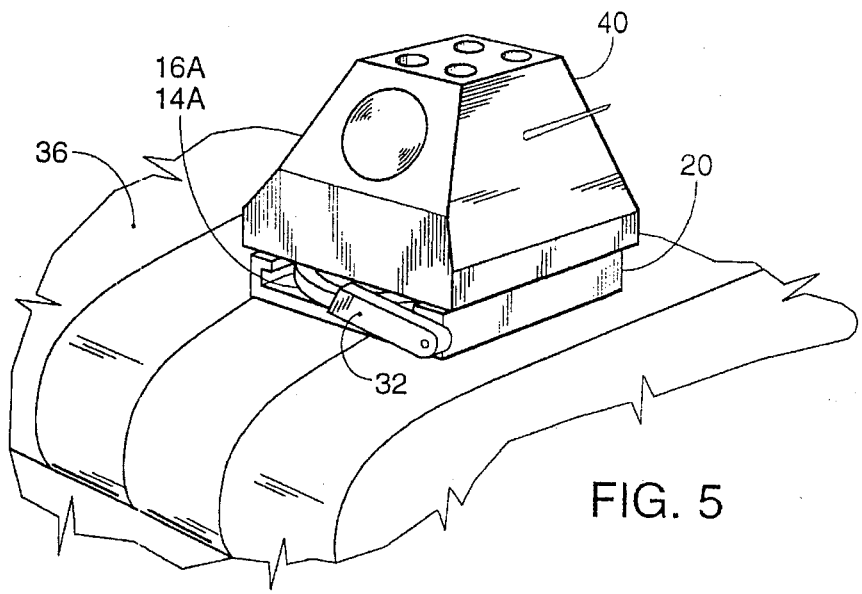
FIG. 5 shows the second accessory of FIGS. 3 and 4 mounted for use in the base mount of FIG. 2.
Figure 5A:
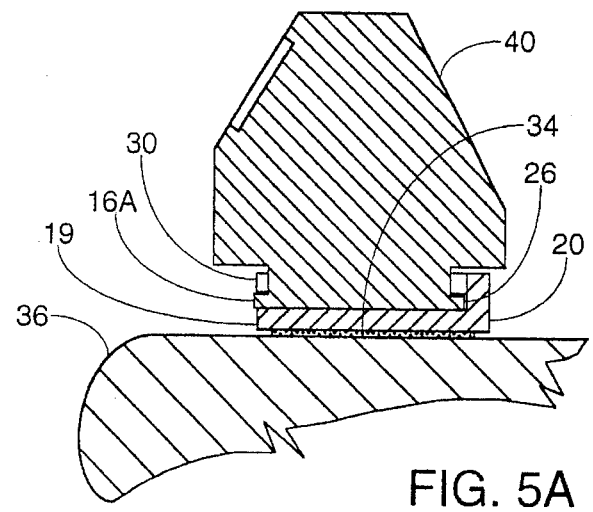
FIG. 5A shows a section of the accessory and mount of FIG. 5.

In FIGS. 5 and 5a, base mount 20 is shown attached to a substantially horizontal portion of vehicle dash 36 by adhesive 34 on underside 19 of base mount 20, and office accessory 40 is shown with bottom flange 16A of base portion 14A confined in base mount 20 where it is retained by latch 32, lips 30 and rear wall 26. It is noted that office accessory 40 may be turned to any desired position by rotating bottom flange 16A within base mount 20, where friction with latch 32 will hold it against undesired movement.

Figure 6:
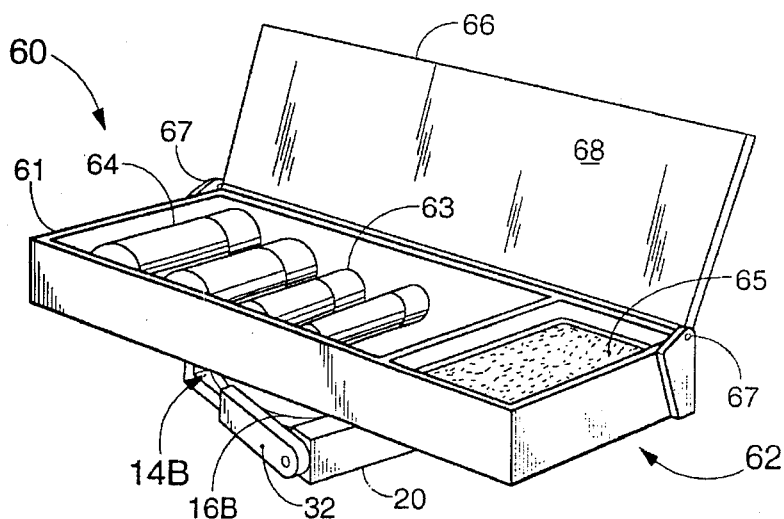
FIG. 6 shows a third accessory mounted for use in the base mount of FIG. 2.
Figure 7:
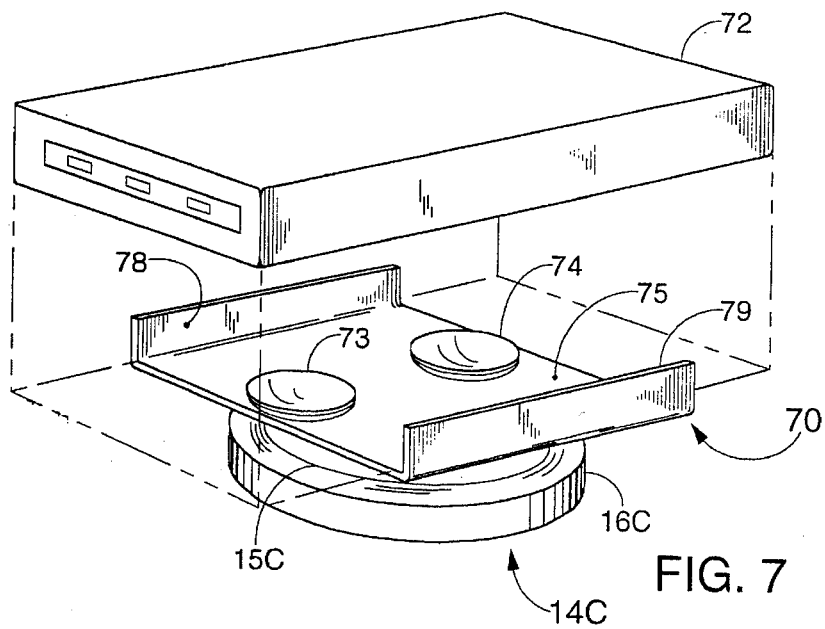
FIG. 7 shows fourth accessory of the present invention, as used to hold a radar detector, for mounting in the base mount of FIG. 2.
Figure 7A:
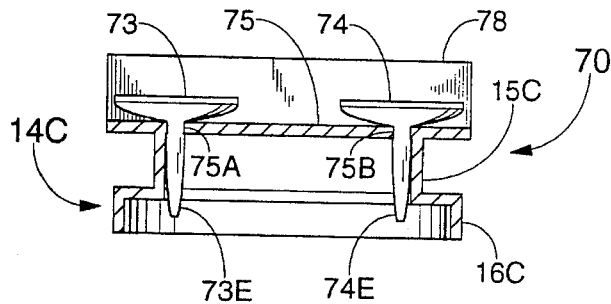
FIG. 7A shows a section view of the accessory of FIG. 7.
Figure 8:
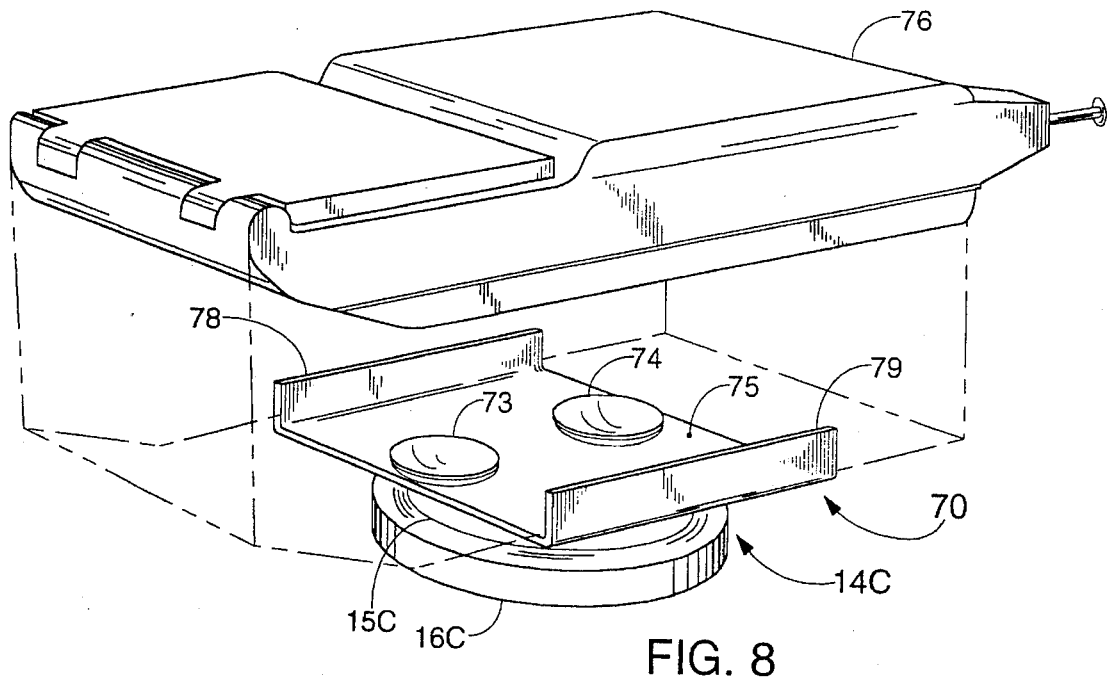
FIG. 8 shows the accessory of FIG. 7 as used to hold a cellular telephone.

FIG. 6 shows cosmetics accessory 60 comprising upper portion 62 and base portion 14B. Upper portion 62 includes compartment 61 for holding various cosmetic items such as lipstick 63, nail polish 64 and powder 65. Compartment 61 is closed by lid 66, which may have mirror 68 on its inner surface, and is pivotally attached to compartment 61 by friction hinge 67 which holds lid 66 in the open position during use. This also serves to hold mirror 68 at any desired tilt angle. Base portion 14B is the same as base portion 14 of cup 10 and bottom flange 16B and groove 15B are, dimensionally identical to bottom flange 16 and groove 15 of FIG. 1. Thus, base portion 14B is shown retained in base mount 20 in the same manner as previously described for cup 10 and office accessory 40. When mirror 68 is included, bottom flange 16B, cooperating with base mount 20, allows and maintains selected positioning thereof.

Thus, the user has individually organized means for engaging in the typical extraneous activities. After draining cup 10, it is removed from base mount 20 and replaced by office accessory 40, cosmetics accessory 60 or appliance holder 70, as the user desires. While not in use, the contents of each accessory remains together and intact.

It is to be understood that the present invention is not limited to the disclosed embodiments and may be expressed by rearrangement or modification or substitution of parts within the same spirit.

I claim:

1. A family of accessories for mounting on a supporting surface in an automobile comprising:
   at least two holders, each of said holders having a different utility and having an upper portion and a base portion, said base portion having a flat, extended bottom flange;
   a base mount including means for selectively receiving and supporting one of said flat, extended bottom flanges and means fitting above said one bottom flange for confinement thereof against upward movement; and
   means for attaching said base mount to the supporting surface;
   said upper portion of each said holder being selected from a group comprising:
   (a) a cup shaped liquid containing means;
   (b) means configured to receive an electronic accessory having a top surface provided with suction cup means for mounting the electronic accessory to said top surface;
   (c) a block shaped stationery holding means having external means for holding office papers and means for holding at least one pencil; and
   (d) a rectangular cosmetic holding means having a compartmented interior and hinged lid means for covering said compartmented interior;
   wherein said upper portion of the first of said at least two holders is different than said upper portion of the second of said at least two holders.

2. A family of accessories for mounting on a supporting surface in an automobile comprising:
   a first holder having a cup shaped first upper portion configured for a first utility of containing a liquid and a first base portion having a flat, extended bottom flange;
   a second holder having a block shaped second upper portion configured for a second utility, having means for holding a pencil and a second base portion including a second flat, extended bottom flange shaped the same as the bottom flange of said first base portion;
   a third holder with a compartmented interior configured for a third utility, with a hinged lid for covering said compartmented interior and a third base portion including a third flat, extended bottom flange shaped the same as the bottom flange of said first base portion;
   a fourth holder configured for a fourth utility, having a top surface provided with suction cup means for holding electronic appliances and including a fourth flat, extended bottom flange shaped the same as the bottom flange of said first base portion;
   a base mount including means for selectively receiving and supporting one of said flat, extended bottom flanges and means fitting above said one bottom flange for confinement thereof against upward movement; and
   means for attaching said base mount to the supporting surface.

3. A family of accessories according to claim 2 wherein said base mount further comprises:
   an under surface for attachment to said substantially horizontal supporting surface;
   an upper surface having front, rear and side borders wherein said front border is open;
   opposed side walls at said upper surface side borders to confine said one bottom flange therebetween, said side walls including inwardly extending lips to confine said one bottom flange against upward movement; and
   means at said upper surface rear border for confining said one bottom flange against rearward movement.

4. A family of accessories according to claim 2 and further comprising:
   a latching member pivotally attached to said base mount and moveable from a first position, allowing unobstructed reception of said one bottom flange, to a second position, retaining said one bottom flange in place.

5. A family of accessories for mounting on a supporting surface in an automobile comprising:
   a first holder having a cup shaped first upper portion configured for a first utility of containing a liquid and a first base portion having a flat, extended bottom flange;
   a second holder having a block shaped second upper portion configured for a second utility, having external means for holding office papers, means for holding a pencil and a second base portion including a second flat, extended bottom flange shaped the same as the bottom flange of said first base portion;
   a base mount including means for selectively receiving and supporting one of said flat, extended bottom flanges and means fitting above said one bottom flange for confinement thereof against upward movement; and means for attaching said base mount to the supporting surface.

6. A family of accessories according to claim 5 wherein said base mount further comprises:

an under surface for attachment to said substantially horizontal supporting surface;

an upper surface having front, rear and side borders wherein said front border is open;

opposed side walls at said upper surface side borders to confine said one bottom flange therebetween, said side walls including inwardly extending lips to confine said one bottom flange against upward movement; and means at said upper surface rear border for confining said one bottom flange against rearward movement.

7. A family of accessories according to claim 5 and further comprising:

a latching member pivotally attached to said base mount and moveable from a first position, allowing unobstructed reception of said one bottom flange, to a second position, retaining said one bottom flange in place.

8. A family of accessories according to claim 5 and further comprising:

a third holder having a top surface provided with means for mounting an electronic accessory, said holder further including a third flat, extended bottom flange shaped the same as the bottom flange of said first base portion and adapted to be selectively received within said base mount.

9. A family of accessories for mounting on a supporting surface in an automobile comprising:

a first holder having a cup shaped first upper portion specifically configured for a first utility of containing a liquid and a first base portion having a flat, extended bottom flange;

a second holder configured for a second utility, with a rectangularly compartmented interior and hinged lid means for covering thereof and further including a second base portion having a second flat, extended bottom flange shaped the same as the bottom flange of said first base portion;

a base mount including means for selectively receiving and supporting one of said flat, extended bottom flanges and means fitting above said one bottom flange for confinement thereof against upward movement; and means for attaching said base mount to the supporting surface.

10. A family of accessories according to claim 9 wherein said base mount further comprises:

an under surface for attachment to said substantially horizontal supporting surface;

an upper surface having front, rear and side borders wherein said front border is open;

opposed side walls at said upper surface side borders to confine said one bottom flange therebetween, said side walls including inwardly extending lips to confine said one bottom flange against upward movement; and means at said upper surface rear border for confining said one bottom flange against rearward movement.

11. A family of accessories according to claim 9 and further comprising:

a latching member pivotally attached to said base mount and moveable from a first position, allowing unobstructed reception of said one bottom flange, to a second position, retaining said one bottom flange in place.

12. A family of accessories according to claim 9 wherein said second holder further comprises:

a mirror attached to said hinged lid means.

13. A family of accessories according to claim 9 and further comprising:

a third holder having a top surface provided with means for mounting an electronic accessory, said holder further including a third flat, extended bottom flange shaped the same as the bottom flange of said first base portion and adapted to be selectively received within said base mount.

14. A family of accessories for mounting on a supporting surface in an automobile comprising:

a first holder having a cup shaped first upper portion specifically configured for a first utility of containing a liquid and a first base portion having a flat, extended bottom flange;

a second holder configured for a second utility, having a top surface provided with suction cup means for mounting an electronic accessory and a second base portion including a second flat, extended bottom flange shaped the same as the bottom flange of said first base portion;

a base mount including means for selectively receiving and supporting one of said flat, extended bottom flanges and means fitting above said one bottom flange for confinement thereof against upward movement; and means for attaching said base mount to the supporting surface.

15. A family of accessories according to claim 14 wherein said base mount further comprises:

an under surface for attachment to said substantially horizontal supporting surface;

an upper surface having front, rear and side borders wherein said front border is open;

opposed side walls at said upper surface side borders to confine said one bottom flange therebetween, said side walls including inwardly extending lips to confine said one bottom flange against upward movement; and means at said upper surface rear border for confining said one bottom flange against rearward movement.

16. A family of accessories according to claim 14 and further comprising:

a latching member pivotally attached to said base mount and moveable from a first position, allowing unobstructed reception of said one bottom flange, to a second position, retaining said one bottom flange in place.

17. A family of accessories for mounting on a supporting surface in an automobile comprising:

a first holder with a block shaped first upper portion configured for a first utility, having means for holding a pencil and a first base portion including a flat, extended bottom flange;

a second holder with a rectangularly compartmented interior configured for a second utility, having hinged lid means for covering said compartmented interior and a second base portion, including a second flat, extended bottom flange shaped the same as the bottom flange of said first base portion;

a base mount including means for selectively receiving and supporting one of said flat, extended bottom flanges and means fitting above said one bottom flange for confinement thereof against upward movement; and means for attaching said base mount to the supporting surface.

18. A family of accessories according to claim 17 and further comprising:

a third holder having a top surface provided with suction cup means configured for a third utility of holding electronic appliances, said holder further including a third flat, extended bottom flange shaped the same as the bottom flange of said first base portion and adapted to be selectively received within said base mount.

19. A family of accessories for mounting on a supporting surface in an automobile comprising:

a first holder with a block shaped first upper portion configured for a first utility, having means for holding at least one pencil and a first base portion including a flat, extended bottom flange;

a second holder having a top surface provided with suction cup means configured for a second utility of mounting an electronic accessory and a second base portion including a second flat, extended bottom flange shaped the same as the bottom flange of said first base portion;

a base mount including means for selectively receiving and supporting one of said flat, extended bottom flanges and means fitting above said one bottom flange for confinement thereof against upward movement; and means for attaching said base mount to the supporting surface.

20. A family of accessories for mounting on a supporting surface in an automobile comprising:

a first holder with a compartmented interior configured for a first utility, having a hinged lid for covering said compartmented interior and including a first base portion having a first flat, extended bottom flange;

a second holder configured for a second utility having a top surface provided with suction cup means for mounting an electronic accessory and a second base portion including a second flat, extended bottom flange shaped the same as said first bottom flange;

a base mount including means for selectively receiving and supporting one of said flat, extended bottom flanges and means fitting above said one bottom flange for confinement thereof against upward movement; and means for attaching said base mount to the supporting surface.

* * * * *